US 6,720,771 B2

(12) United States Patent
Gupta et al.

(10) Patent No.: US 6,720,771 B2
(45) Date of Patent: Apr. 13, 2004

(54) MOVING SOURCE DIPOLE ELECTROMAGNETIC EXPLORATION DEVICE FOR DEEPER AND POORER CONDUCTORS AND A METHOD OF DETECTING SUCH CONDUCTORS

(75) Inventors: Om Prakash Gupta, Hyderabad (IN); Sureneni Nageswara Rao, Hyderabad (IN); Madhu Sudan Joshi, Hyderabad (IN)

(73) Assignee: Council of Scientific & Industrial Research (IN)

( * ) Notice: Subject to any disclaimer, the term of this patent is extended or adjusted under 35 U.S.C. 154(b) by 0 days.

(21) Appl. No.: 10/105,256

(22) Filed: Mar. 26, 2002

(65) Prior Publication Data

US 2004/0000919 A1 Jan. 1, 2004

(51) Int. Cl.$^7$ .................................................. G01V 3/18
(52) U.S. Cl. ................................. 324/339; 702/7
(58) Field of Search .............................. 324/637, 639, 324/338, 339; 702/7

(56) References Cited

U.S. PATENT DOCUMENTS 6,100,696 A * 8/2000 Sinclair ...................... 324/339
6,489,772 B1 * 12/2002 Holladay et al. ............ 324/339

* cited by examiner

Primary Examiner—Albert Decady
Assistant Examiner—James Kerveros
(74) Attorney, Agent, or Firm—Piper Rudnick LLP; Steven B. Kelber

(57) ABSTRACT

The present invention relates to a moving dipole source electromagnetic induction device and method for carrying out geophysical surveys. The device is useful to locate deeper sub-surface bodies under poor electrical conducting surfaces and for mapping sub-surfacial conductivity changes due to salinity or pollution. The device includes a transmitter coil forming a series resonant circuit with tuning capacitor producing primary electromagnetic field and a receiver set. The receiver set up picks up resultant time varying feeble secondary electromagnetic field produced by transmitter components and a target. The secondary field amplitude is improved by increasing power of the transmitter coil. The transmitter and receiver set up produces an analog signal which is fed to A/D converter to obtain a digital signal to display the obtained data on an LCD display and storing the same data in a digital computer.

32 Claims, 9 Drawing Sheets

ANALOG HARDWARE.

TIMING DIAGRAM

DIGITAL HARDWARE

MEASUREMENT CYCLE

MEASUREMENT CYCLE

COMPARATIVE ANOMALY PROFILES OVER A VERTICAL SHEET CONDUCTOR FOR
(a) ZERO FIELD AND (b) CONVENTIONAL HORIZONTAL, COPLANAR COIL
SYSTEMS (L=12.0cm, f=5.6KHz, TARGET: GRAPHITE SHEET, DEPTH=8.4cm)

ANOMALY PROFILES FOR ZERO FIELD, HORIZONTAL COIL SYSTEM
FOR DIFFERENT DEPTHS OF TARGET CONDUCTOR
(L=12.0cm, f=5.6KHz, TARGET: GRAPHITE SHEET)

COMPARATIVE ANOMALY PROFILES OVER A VERTICAL SHEET CONDUCTOR
(a) ZERO FIELD AND (b) CONVENTIONAL VERTICAL, COPLANAR COIL
SYSTEMS (L=12.0cm, f=5.6KHz, TARGET: GRAPHITE SHEET, DEPTH=8.4cm)

MOVING SOURCE DIPOLE ELECTROMAGNETIC EXPLORATION DEVICE FOR DEEPER AND POORER CONDUCTORS AND A METHOD OF DETECTING SUCH CONDUCTORS

FIELD OF INVENTION

The present invention relates to moving dipole source electromagnetic induction device for deeper and poorer electrically conducting subsurface bodies. The present invention also relates to a method for detecting deeper and poorer electrically conducting subsurface bodies.

BACKGROUND AND PRIOR ART REFERENCES

The constant search for new mineral deposits have become important to our civilization as the demand for metals, petroleum, and water increase with increasing industrialization. Geophysical methods, which take advantage of the various physical properties of the earth's material, have a well-established place in this under-ground exploration. Electrical conductivity, a very wide-ranging physical property of $10^{-14}$ to $10^8$ $Sm^{-1}$, has been exploited in electromagnetic methods of exploration. Electromagnetic methods fall into two categories:

(i) natural field methods, and
(ii) controlled source methods

The first method relies on source fields generated by ionosphere and magnetotelluric current or spontaneous current associated with electrochemical activity of the earth's material. As the source distribution in the natural field methods is unknown, the number of variables increases. In the second method artificial field can be created by means of direct, alternating or pulsed current. The energizing source is under control of user and can be exploited to increase the resolution of data by using variable frequencies. Artificial fields can be applied conductivity (through electrodes) or inductivity (by means of coils or large wire loops). Finally, in both the methods different parameters of the resultant electric or electromagnetic field are measured. Electromagnetic induction methods are based on the well known principle of electrical induction i.e., a time varying primary field inducing electric currents in conductors. The secondary currents flow in such a way that the resulting electromagnetic field opposes the primary inducing field. The two fields will have the same frequency but will generally differ in direction, magnitude and phase with resultant field being elliptically polarized. A number of exploration systems have been conceived on the basis of geometry of plane of polarization. The secondary electromagnetic field is commonly termed in geophysical literature as the response or the anomaly due to the target. Its magnitude and variation in space and time also comprises the basis of some of electromagnetic systems. The anomaly characteristics are suitably interpreted in terms of geological and geometrical characteristics of the causative body.

In mineral prospecting, inductive electromagnetic methods have attained greater popularity than conductive electromagnetic methods as the former react to absolute conductivity, rather than conductivity contrast and can distinguish between highly and moderately conductive target. Also, in large regions of permafrost, deserts or arid tracts where conductive contact is not possible due to high resistivity layer on the surface inductive methods can be employed conveniently. An additional advantage of them over conductive methods is that they do not require electrical contact with the ground and thus can be moved rapidly over earth's surface and also adopted in airborne reconnaissance survey.

Usually inductive electromagnetic methods are further classified according to the type of energizing source, the receiving system employed and the quantity measured. The methods the distance between source and target is variable, giving rise to larger anomalies. Portability requirements dictate that in most instances the source should be three-dimensional (3D). On the other hand, in fixed source methods, the distance between source and receiver is variable and is fixed between source and target. The power of the source can be increased considerably which is not possible beyond a certain limit with the moving source methods.

Artificial moving source inductive Electromagnetic (EM) methods in frequency domain are widely employed as they can be used in field prospecting both on ground and airborne survey.

Most commonly used transmitter [T]—receiver [R] coil configurations are: (1) Horizontal—Horizontal [Horizontal Coplanar]; (2) Vertical—Vertical—[Vertical Coplanar]; (3) Vertical Co-axial and (4) Horizontal—Vertical—[cross coupled]. Horizontal Coplanar method has achieved steadily increasing popularity since its introduction in the late 1930s. This method, also known as Slingram, employs a variable frequency (100 Hz–4000 Hz) and separation (20 m–200 m). A systematic nomenclature for various moving transmitter—receiver configurations is given by Parasnis (1970). The quantities measured are inphase (IP) and quadrature (OP) (90° out of phase) components of the anomaly vector resolved in time phase with respect to the primary field.

Phase measuring techniques carry other advantages besides improved accuracy in locating anomalies. Firstly phase difference between the primary and resultant field is essentially a target conductivity phenomenon, which is not affected by geometric irregularities in the primary field. Secondly, the phase provides a clue to the conductivity of the target. Because of essential simplicity of instrumentation, operation and the progress in electronics in phase measuring techniques this method received further impetus both in direct application from air and in subsequent ground follow up. In a field survey the profile directions are laid perpendicular to the strike of the conductor. Two men crew is sufficient to conduct a survey. Survey can be done in INLINE configuration and BROADSIDE configuration.

The Transmitter [T] and Receiver [R] are moved in tandem along the profile direction in inline configuration. In this configuration T and R straddle the target one after other. In Broadside configuration the T and R are held parallel to the strike of the conductor and perpendicular to profile direction.

In frequency domain several EM mineral prospecting moving source-receiver systems have been fruitfully used for nearly six decades to detect shallow massive sulfide ore bodies. However, the ratio of the feeble response from the target to the strong primary field (which is the parameter measured with these systems) is very small in case of deeper and poorer conducting bodies.

Time domain EM methods were, therefore, developed wherein a repetitive pulsed primary field energizes the earth and the transient secondary field is measured while the primary field is zero. However, these methods require more intense primary field and the circuit design for transient signals is more difficult than for sinusoidal signals.

Frequency domain methods, however, are more suitable for faster reconnaissance and detail, are lightweight, portable, cheaper units and probably produce better anomaly resolution. They also have better developed data interpretation. The depth of exploration for all moving dipolar source methods is only 0.6–0.8 L (L=T–R SEPARATION).

OBJECTS OF THE INVENTION

The primary object of the present invention is to provide a moving dipole source electromagnetic induction device for deeper and poorer electrically conducting subsurface bodies.

Another object of the present invention is to provide a method for detecting deeper and poorer electrically conducting subsurface bodies.

Yet another object of the present invention is to provide a device for exploration of mineral, ground water, archeology and mapping of subsurface geology.

Yet another object of the present invention is to provide a device with transmitter coil placed strategically that is not affected by the primary field and measures only the secondary field.

SUMMARY OF THE INVENTION

The present invention relates to moving dipole source electromagnetic induction device for deeper and poorer electrically conducting subsurface bodies. The present invention also relates to a method for detecting deeper and poorer electrically conducting subsurface bodies.

DETAILED DESCRIPTION OF THE INVENTION

The present invention is further explained in the form of following embodiments. Transverse component of the time varying EM field surrounding a circular transmitter coil (T) is zero along same axes. If receiver coil (R) is located at these strategic points parallel to the T, currents are not induced in it by the primary field. Since any induced currents are then the only representative of the secondary field and can be measured with greater accuracy, in absence of the strong primary field.

The transverse component Hz of the magnetic field (perpendicular to the plane of the transmitter coil) due to a current 1 in a circular coil of radius 'a' is given by (Telford et al. 1976)

$$H_z = \frac{L^2(2Z^2 - L^2)}{4(Z^2 + L^2)^{5/2}}$$

where Z and L are the Cartesian coordinates of the point of measurement with reference to the center of the coil. Hz is zero if $$2 Z^2 - L^2 = 0$$

i.e. as Z=±0.7071 L

Thus if the receiver R and transmitter T are separated laterally by L and vertically by Z −0.7071 L with reference to the plane of the coils, then the primary field of T will not induce any current in R. This property is clearly independent of the magnitude and frequency of the current in the transmitter coil. Further the location of transmitter and receiver coils are interchangeable. If the two coils are placed horizontally, however, one of the coils should be at least at a height of 0.7071 L rendering such a field system unwieldy.

This limitation can be overcome if the coils are deliberately placed vertically.

It should be specifically mentioned that the equipment can be used in any conventional setup i.e., T-R coils can be placed in any configuration.

Secondly, the amplitude of the secondary field is measure (not only the IP and OP) which gives us the advantages (a) detection and measurement of feeble secondary field, in absence of primary field, yields comparatively larger anomalies and hence makes it possible to detect poorer and deeper conductors, (b) by increasing the transmitter power, the anomalies are increased. This is not possible in the conventional IP/OP measurement because they are recorded as percentage of the primary field.

E.M. modeling apparatus

A frequency domain electromagnetic moving source apparatus has been developed for laboratory model studies. Sampling technique has been used to measure in-phase (IP) and out-of-phase (OP) components of anomalous field. The phase reference is with respect to transmitter current.

The development of the equipment can be broadly classified into two fields. (i) hardware and (ii) software. The hardware is further divided into [i(a)] analog hardware and [i(b)] digital hardware.

[i(a)] Analog Hardware:

The analog hardware shown in FIG. 1 includes electronics assembly of transmitter and receiver sections of the system.

The oscillator (1) generates variable frequency from 1 kHz to 100 kHz sinusoidal signal with constancy of signal amplitude and frequency.

The output is fed to power amplifier (2). The power amplifier is commercially available with 10 watts assembly board.

This output signal drives a transmitter coil (3) to generate primary EM field. The transmitter coil has self-inductance L=0.95 mH; SWG=30; diameter=5×10$^{-3}$ m and number of turns=650.

The tuning capacitors (4) comprise of an array of capacitors that resonantly tune the transmitter coil to achieve maximum output at a desired frequency. The tuning capacitors resonantly tune the transmitter at frequency to effectively cancel the impedances due to inductance as follows:

$$f_c = \frac{1}{2\Pi\sqrt{LC}}$$

where $f_o$ is tuning frequency, L is inductance of transmitter coil and C is capacitance of the tuning capacitors.

One nearly in phase (IP) sinusoidal signal with the transmitting current is obtained from the series resonant circuit. The IP signal is fed to a capacitor network (5) to obtain nearly out of phase (OP) sinusoidal signal. These IP and OP signals are fed to two separate amplifiers (6a, 6b).

These amplifiers are developed with high input impedance field effect transistor (FET) operational amplifiers having gain of 10.

The two amplified signals are fed to the inputs of a dual comparator (8). The other inputs of the comparators are at steady dc voltages. The dc voltages are derived through two multiturn potentiometers (7a, 7b).

With the sinusoidal voltage at one of its input and steady dc on the other, the comparator produces a rectangular waveform.

The sampling pulse generator (9) consists of two monostable multivibrators. One of the two transitions of the comparator output is used to trigger mono-stable multivibrator which generates 2 μs short duration sampling pulse. The steady dc voltage level controls are adjusted to obtain proper instance of sampling for IP and OP component measurements. The IP and OP sampling pulses are derived for each oscillator cycle. The sampling time is short as compared with the cycle duration.

These pulses are fed one at a time through a selector switch (10) to a high-speed sample and hole amplifier (11). The input and output of the sample and hold amplifier along with sampling pulses are shown in timing diagram (FIG. 2).

The receiver module includes a series of electronic circuits to condition an analog signals detected by the receiver coil (12). The receiver coil has inductance of L=500 mH, SWG=42, diameter of the coil=$5 \times 10^{-3}$ m and number of turns=6500.

The receiver coil picks up resultant tune varying magnetic field due to transmitter setup and conducting target (16).

The receiver signal obtained from a coil placed and oriented as required with reference to the transmitter coil feeds a preamplifier (13) employing high input impedance FET operational amplifiers.

The output of the preamplifier is fed to a fourth order Butterworth high pass filter (14), to provide flat response which leads phase stability in the frequency range.

The output of the filter is amplified with a suitable variable gain amplifier (15). The amplifiers (13 and 15) are designed to optimize the signal to noise ratio over the frequency range.

The amplifier output is sampled with IP or OP sampling pulse through S/H amplifier. The S/H output is fed to a 12 bit analog to digital converter shown in FIG. 3.

(i) Digital Hardware:

The system digital hardware and data processing unit is shown in FIG. 3. The processing system typically includes 8 bit 8085 microprocessor, memory 8 K EPROM, 16 K RAM, 48 I/O lines, 12 bit high speed analog to digital converter and a standard RS-232 C communication interface. The hardware has been designed around a standard EURO-bus structure so that functional enhancement of the system can be easily implemented. The measured parameters data is stored and displayed on a 2 line. 32 digit alphanumeric LCD display. Later the data is transferred to PC through RS-232 communication to obtain hardcopy of the profile data.

A high speed 12 bit A/D converter has very precise calibration and ensures obtaining good measurement results. The high computing ability of the system allows the quality of the data to be improved with selective stacking method.

The system measurement cycle timing diagram is shown in FIG. 2. First it checks the complete cycle of IP or OP sampling pulse and then issues data requisition command to initiate digitization of the signal. The digital A/D data is stored and displayed.

At each step of T-R system position the IP and OP components are measured stored and displayed on LCD display.

(ii) Software:

The system operational software flow chart is shown in FIG. 4. The software (enclosed) is developed in assembly language includes:

a) data acquisitions and averaging of samples to enhance signal to noise ratio b) data computational software of anomalous IP and OP field components given as:

$$IP = \frac{IP_F - IP_R}{IP_F} \times 100$$

$$OP = \frac{OP_F - OP_R}{IP_F} \times 100$$

$IP_F$ free space IP component of the primary field $OP_F$ free space OP component of the primary field is zero $IP_R$ IT component of the resultant field $OP_R$ component of the resultant field c) presentation of measured data on LCD display d) data transfer on to P. C.

Experimental Procedure i) a variable frequency transmitter (frequency range 1 kHz to 15 kHz)

ii) a dipole-dipole transmitter-receiver coil configuration adjustable to several orientations, variable mutual separation and height above the model iii) a resolved component measuring system—detected and recorded iv) a large set of different metallic sheet are models (aluminum, stainless steel, graphite) having different lengths, depths extends and thickness, a wooden model tank and tray for holding salt solution to simulate conducting host and overburden, respectively and v) the transmitter and receiver coils are mounted on an adjustable frame which is fitted on a carriage moving over wooden rails. A scale fixed to one of these rails indicates the position of the coils. The rails are placed on top of a wooden tank containing the model conductor and salt solution (when simulating conducting host medium).

Operational Procedure

1. Switch on multi output dc power supply 5 V, 15 V and −15 V
2. Operate reset key on the keypad attached to the panel of the unit—Display shows "MICRO-85"
3. Operate block moves and shift keys—Display shows "No"
4. Operate keys to display 6000—Display shows "6000 No"
5. Operate key next—Display shows "No"
6. Operate keys to display 6 FFF—Display shows "6 FFF.No"
7. Operate next key—display 6 FFF disappears "no" remains
8. Operate keys to display 4000—Display shows "4000.No"
9. Operate execute key
10. Switch on the function Generator and select "sine wave" output
11. Select frequency selector band switch for desired operating frequency
12. Operate keys go—Display shows "go"
13. Operate keys 4000 to display and operate execute key—Display shows "EM MODEL LAB WELCOMES YOU"
14. Move T-R system away from the model; i.e., to one end of model tank
15. Put selector switch in PRIMARY mode
16. Put selector switch in IP measurement mode
17. Put selector switch of receiver to ON
18. Display shows "PRIMARY FIELD IP=————mV"
19. Adjust IP sampling time potentiometer to get maximum reading in display
    Don't disturb this setting during the experiment
    Set selector switch to OP measurement mode—Display shows "PRIMARY FIELD OP—~mV",
20. Adjust OP sampling time potentiometer to get minimum reading. Don't disturb this setting during the experiment 21. Select switch from primary mode to anomaly mode
22. Set selector switch in IP measurement
23. Move T-R system tralley at a new location (2.5 cm) away from tank, wall operate measurement key—Display shows "ANOMALOUS FIELD IP=——%"
24. Follow step No. 23 and at each location of T-R system observe and record IP values in the lab register. Also the data will be stored in the memory of the unit for transfer to a PC
25. After completion of one profile bring back T-R tralley to a starting point
26. Select switch to OP measurement—Display shows "PRIMARY FIELD OP=——mV"
27. Select switch to anomaly mode display shows "ANOMALOUS FIELD OP=——%"
28. Move T-R tralley across target and as in steps No. 23–25
29. Set selector switch to primary mode. Operate reset key—Display shows "MICRO 85"

BRIEF DESCRIPTION OF THE ACCOMPANIED DRAWINGS

Figure 1:
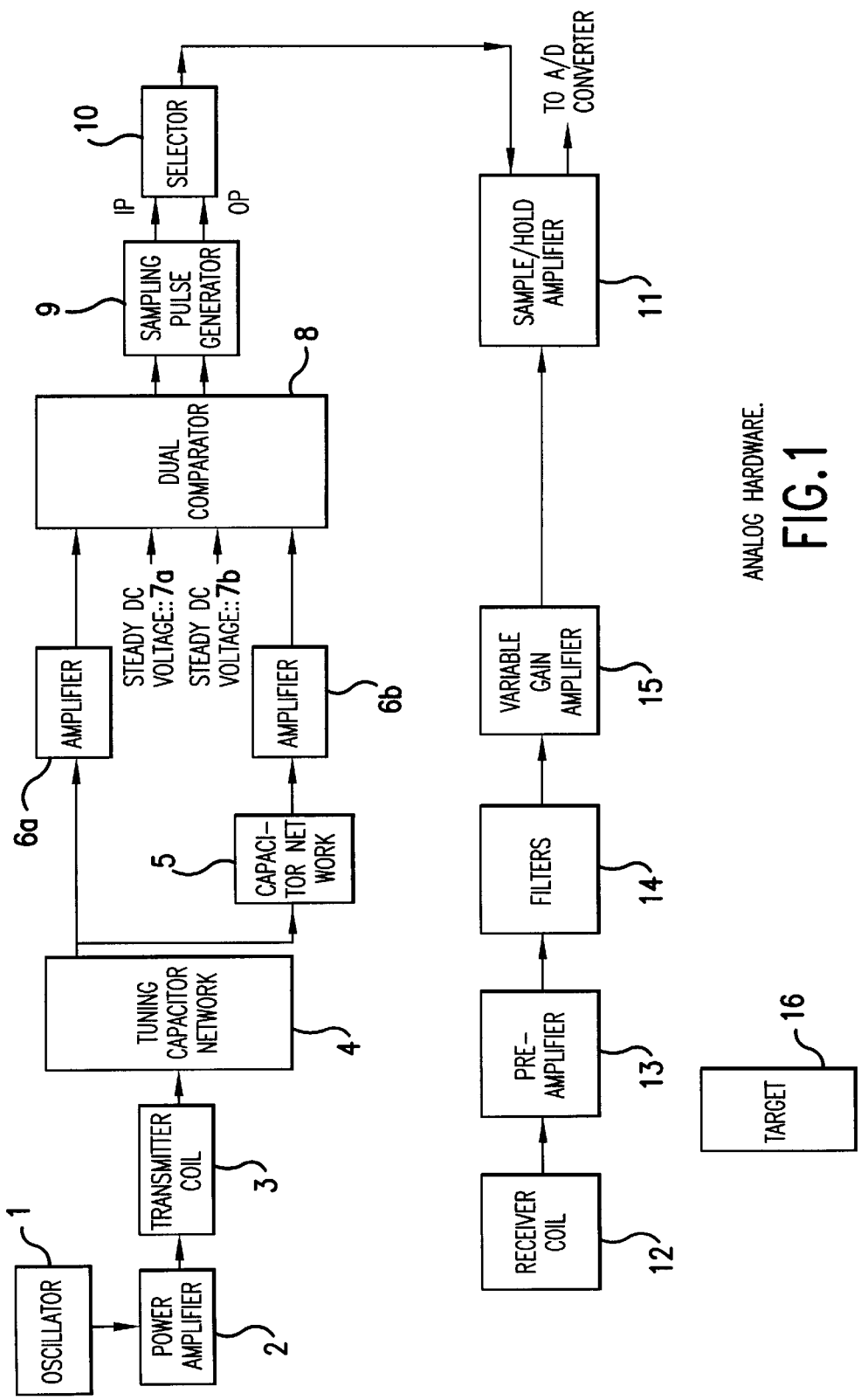
FIG. 1 is a simplified analog hardware functional blocks of electromagnetic measurement system.
Figure 2:
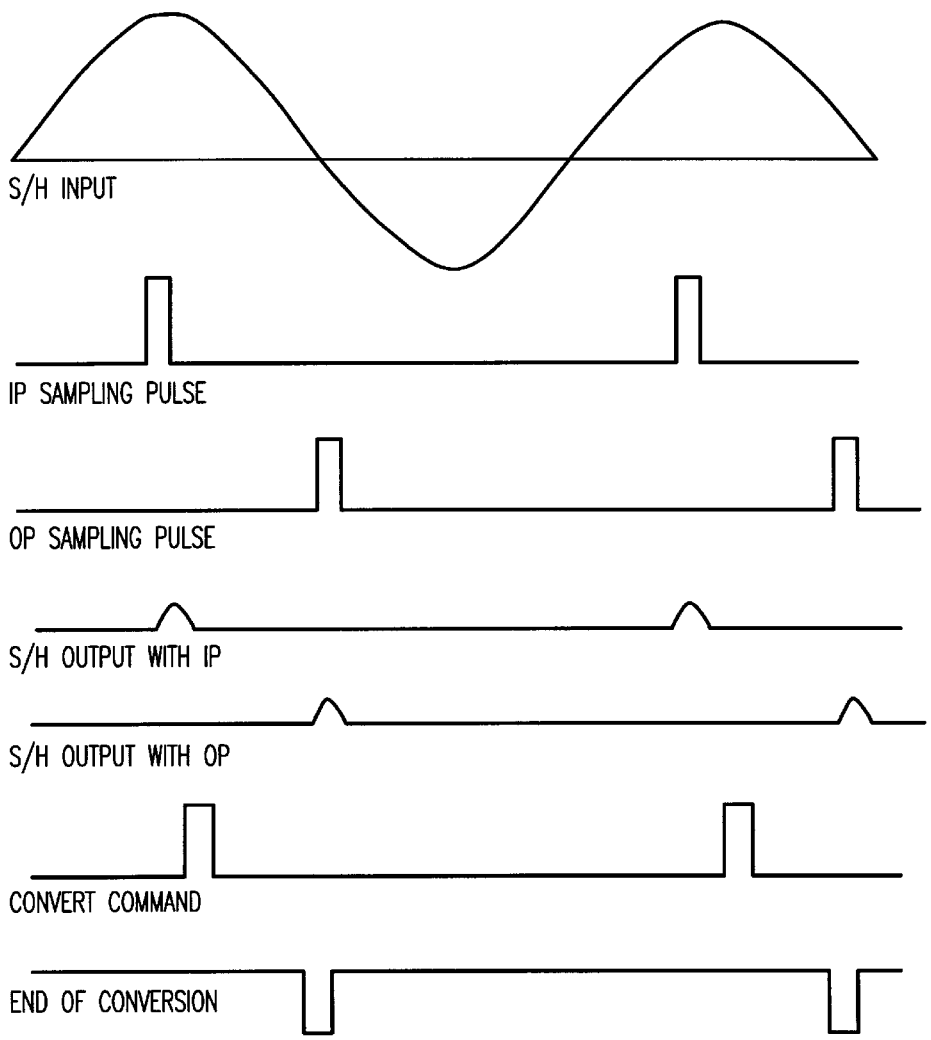
FIG. 2 is a basic timing diagram of the system.
Figure 3:
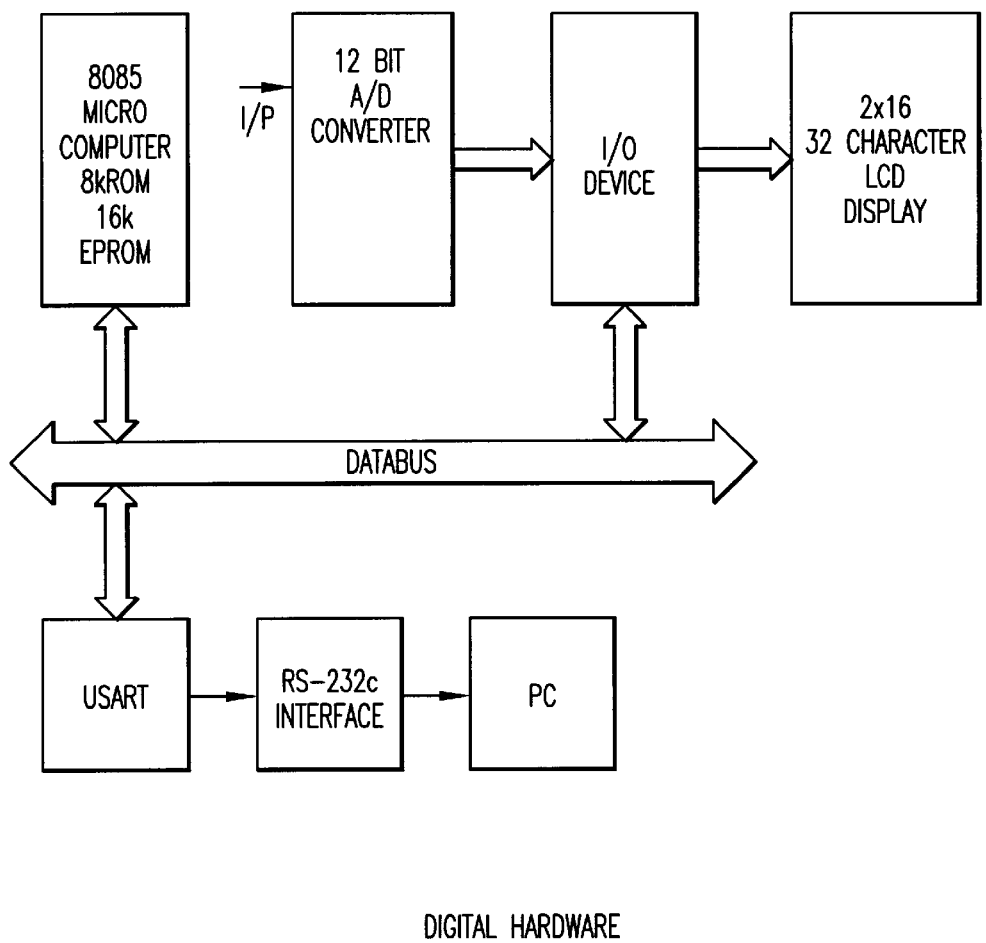
FIG. 3 is a simplified digital hardware functional blocks of electromagnetic measurement system.
Figure 4A:
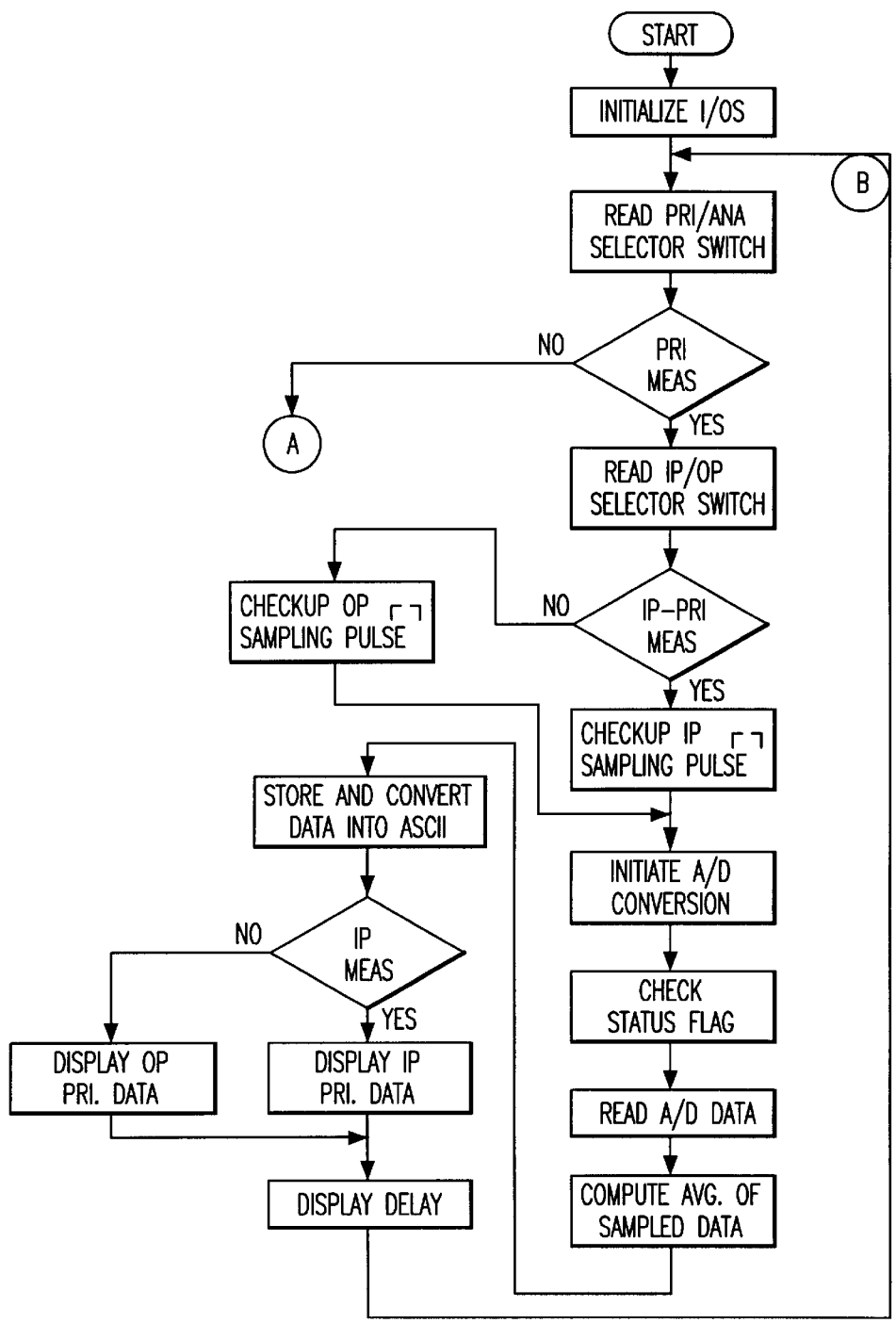

FIG. 4(a) Flowchart of measurement cycle.

Figure 4B:
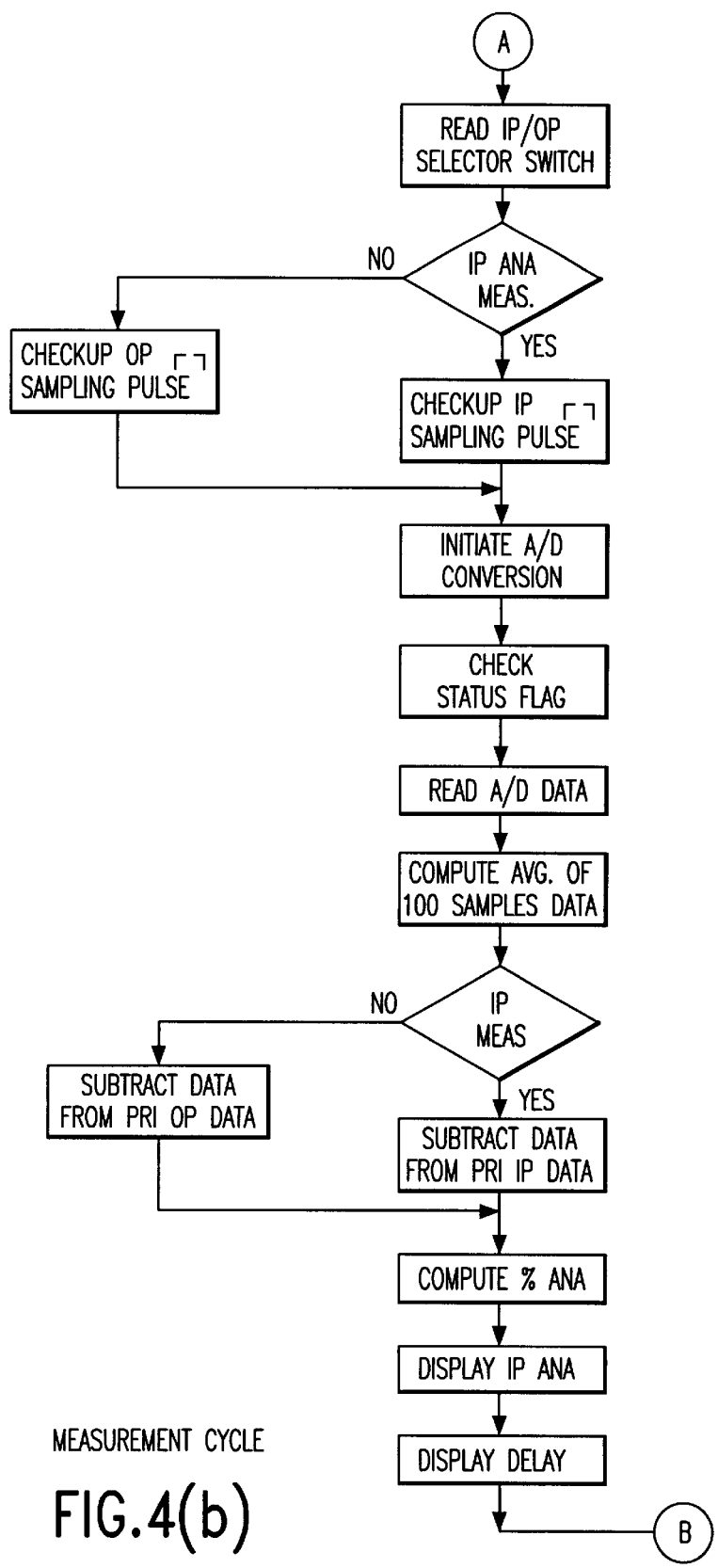

FIG. 4(b) Flowchart of measurement cycle.

Figure 5:
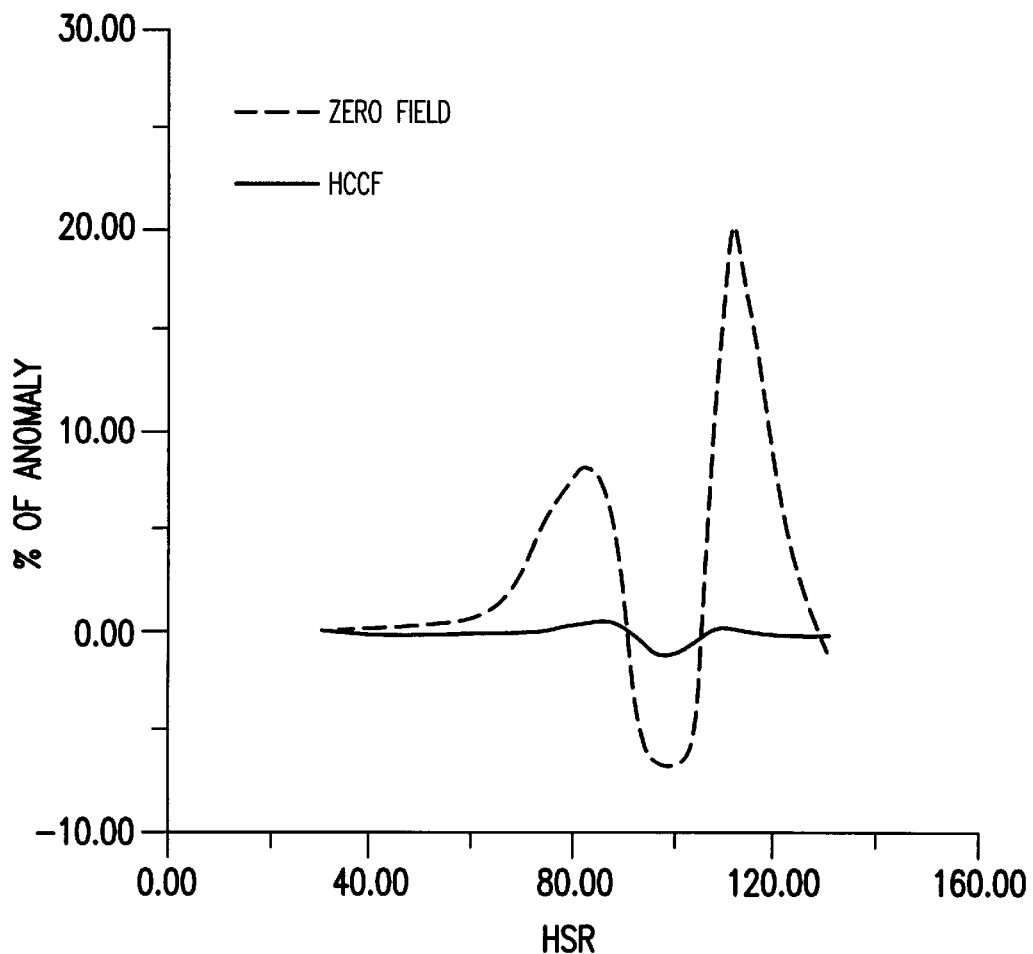

FIG. 5 presents comparative anomaly profile over a vertical sheet conductor for (A) zero field and equivalent (B) conventional horizontal coplanar coil system. It may be noted for the later, the anomaly is about 1.3% only whereas for the new system the anomaly is about 25%.

Figure 6:
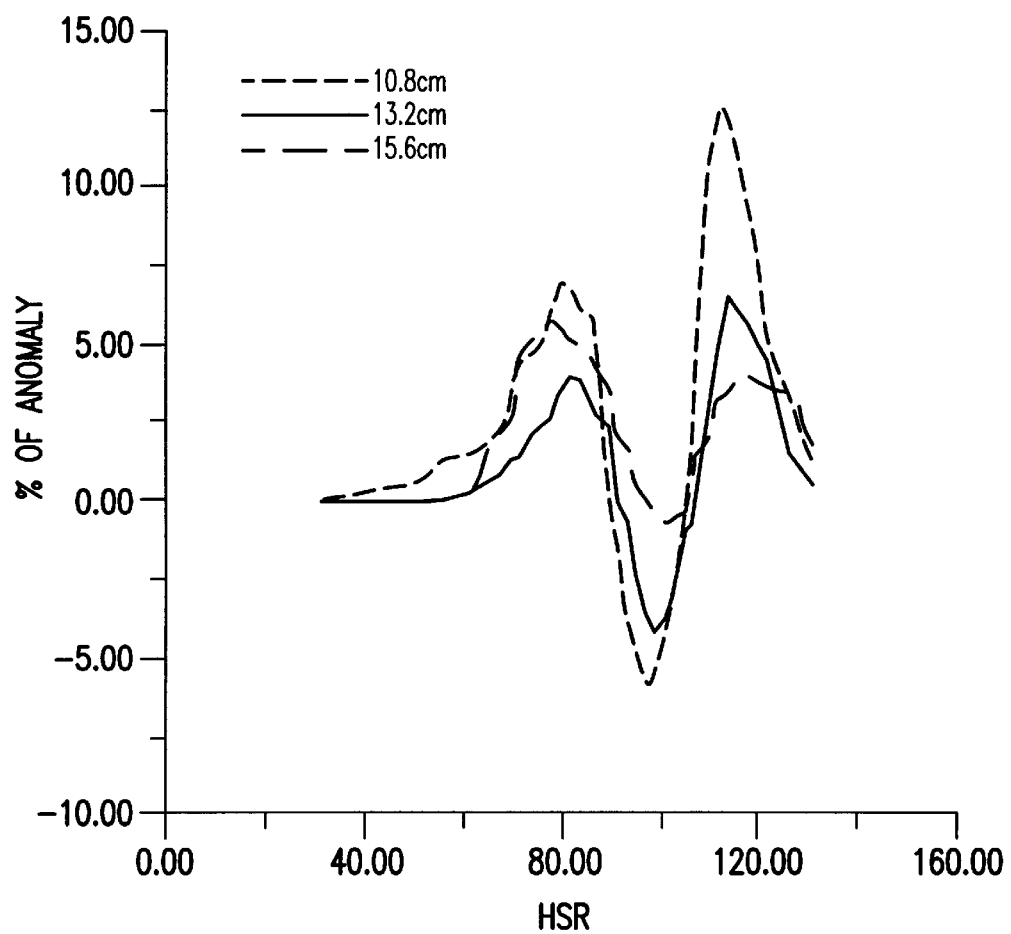

FIG. 6 presents anomaly profiles for the zero field, horizontal coil system for a conductor at different depths. Even for target depths of 15.6 cm the total anomaly is about 6%. For equivalent conventional EM system, a conductor deeper than 9.0 cm does not produce measurable response.

Figure 7:
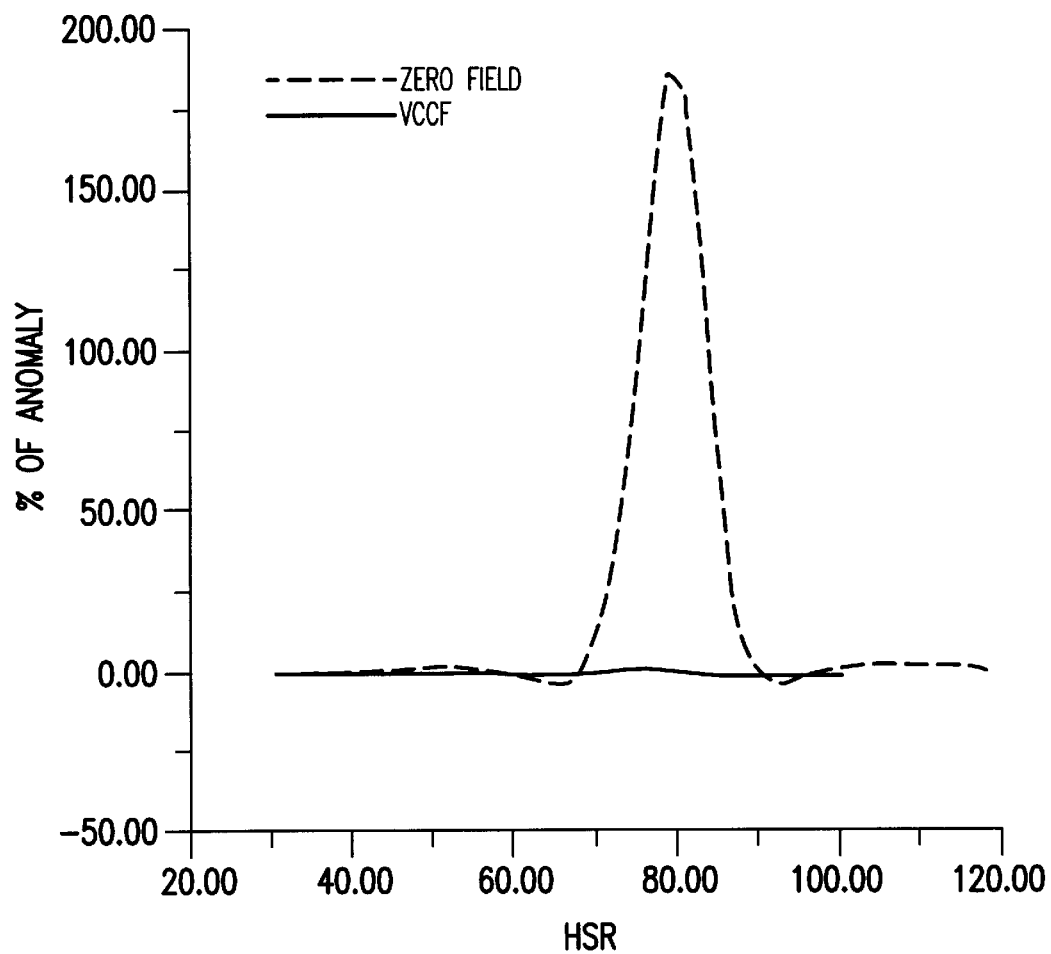

FIG. 7 presents comparative anomaly profile over a vertical sheet conductor for (A) zero field and equivalent (B) conventional Vertical coplanar coil system. It may be noted for the later, the anomaly is about 2.16% only whereas for the new system the anomaly is about 187%.

Figure 8:
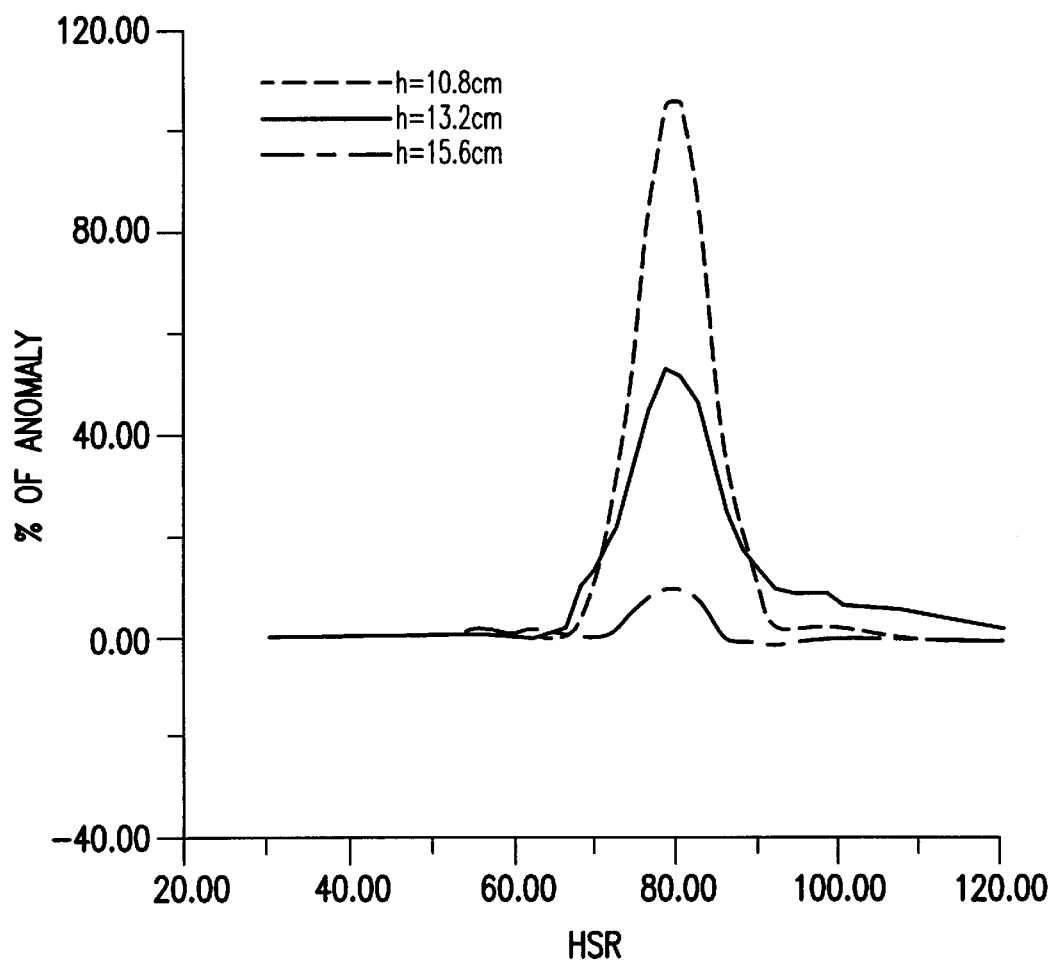

FIG. 8 shows anomaly profiles for zero field vertical coil system over model conductors at different depths. Compared to zero field horizontal coil system (FIG. 6) the vertical coil system records larger anomalies.

What is claimed is:

1. A moving dipole source electromagnetic induction device for carrying out geophysical surveys, to locate deeper sub-surface bodies under poorer electrical conducting surfaces and for mapping sub-surfacial conductivity changes due to salinity or pollution, the device comprising:

(a) an oscillator configured to generate a variable desired operating frequency sinusoidal signal;

(b) power amplifier coupled to the oscillator, with the desired variable frequency sinusoidal signal from the oscillator as input and an amplified signal as output;

(c) a transmitter coil coupled to the power amplifier, with the amplified signal from the power amplifier as input, the transmitter coil configured to generate a primary electromagnetic field as output;

(d) tuning capacitors coupled to the transmitter coil to form a series resonant circuit, with the primary electromagnetic field from the transmitter coil as input and an in-phase sinusoidal signal as output;

(e) a capacitor network coupled to the tuning capacitor, with the in-phase sinusoidal signal from the tuning capacitor as input and an out-of-phase sinusoidal signal as output;

(f) a first amplifier coupled to the tuning capacitor, with the in-phase sinusoidal signal from the tuning capacitor as input and an amplified in-phase sinusoidal signal as output;

(g) a second amplifier coupled to the capacitor network with the out-of-phase sinusoidal signal from the capacitor network as input and with an amplified out-of-phase sinusoidal signal as output;

(h) a pair of potentiometers for producing a pair of dc voltages;

(i) a dual comparator coupled to the first and second amplifiers and potentiometers, with the in-phase and out-of-phase sinusoidal signals from the first and second amplifiers along with dc voltages from the potentiometers as input and a rectangular waveforms as output;

(j) a sampling pulse generator having two monostable multivibrators, coupled to the dual comparator, with the rectangular waveforms from the dual comparator as input and short duration time pulses as output;

(k) a selector switch, coupled to the sampling pulse generator, with short duration time pulses from the sampling pulse generator as input, the selectors switch being configured to output the short duration time pulses from the sampling pulse generator one at a time;

(l) a receiver coil configured to pick up a time varying secondary electromagnetic field from a conducting target which is a subsurface body and produce a received signal in response thereto;

(m) a preamplifier, coupled to the receiver coil, with the received signal as input and with an amplified received signal as output;

(n) a filter, coupled to the preamplifier, with the amplified received signal from the preamplifier as input, the filter being configured to provide a flat response leading to phase stability in a desired operating frequency range;

(o) a variable gain amplifier, coupled to the filter;

(p) a sample and hold amplifier, coupled to the selector switch and the variable gain amplifier, with short duration time pulses from the selector switch and a filtered amplified received signal from the variable gain amplifier as inputs;

(q) an analog to digital converter, coupled to the sample and hold amplifier, the analog to digital converter being configured to output digital data representative of an output of the sample and hold amplifier;

(r) an input/output device, coupled to the analog to digital converter, the input/output device being configured to generate an output for an LCD display;

(s) an LCD display, coupled to the input/output device; and (t) a microcomputer unit for data computation coupled to the input/output device via a data bus.

2. The device of claim 1, wherein the sub-subsurface body comprises a deposit selected from the group consisting of metals, minerals, ores, petroleum, water, buried pipes and cables, landmines and archaeological artifacts.

3. The device of claim 1, wherein the oscillator generates a variable frequency from 1 to 100 kHz sinusoidal signal with a constant signal amplitude and frequency.

4. The device of claim 1, wherein the power amplifier has a power of 10 watts.

5. The device of claim 1, wherein the tuning capacitor consists of an array of capacitors configured to resonantly tune the transmitter coil to achieve maximum output at a desired frequency.

6. The device of claim 1, wherein the first and second amplifiers include high input impedance field effect transistor (FET) operational amplifiers having a gain of 10.

7. The device of claim 1, wherein the the monostable multivibrators of the sampling pulse generator generate 2 $\mu$s short duration sampling pulses.

8. The device of claim 1, wherein a sampling time is shorter than a cycle duration.

9. The device of claim 1, wherein the secondary electromagnetic field produced by the conducting target is a feeble secondary electromagnetic field.

10. The device of claim 1, wherein the preamplifier includes high input impedance field effect transistor operational amplifiers.

11. The device of claim 1, wherein the filter is a fourth order Butterworth high pass filter.

12. The device of claim 1, wherein the preamplifier and the variable gain amplifier optimize signal to noise ratio over a desired operating frequency range.

13. The device of claim 1, wherein the microcomputer unit comprises an 8-bit 8085 microprocessor.

14. The device of claim 1, wherein the microcomputer unit comprises 8 K EPROM and 16 K RAM.

15. The device of claim 1, wherein the analog to digital converter is a 12 bit high speed converter.

16. The device of claim 1, wherein the input/output device comprises 48 input/output lines.

17. The device of claim 1, wherein the LCD display is a 2 line, 32 digit alphanumeric display.

18. The device of claim 1, further comprising:
   a Universal Synchronous Asynchronous Receiver Transmitter (USART) coupled to the data bus;
   a communications interface connected to the USART; and
   a digital computer connected to the communications interface.

19. The device of claim 18, wherein the communications interface is an R2-232C interface.

20. The device of claim 1, wherein the data bus has a EURO-bus structure.

21. The device of claim 1, wherein the microcomputer is configured to average of samples to enhance signal to noise ratio.

22. The device of claim 1, wherein the receiver coil is placed parallel to the transmitter coil at a point such that the primary field induces zero current, wherein only anomalous fields are picked up.

23. The device of claim 1, wherein the device is configured to be compatible with any Transmitter-Receiver coil configuration.

24. The device of claim 1, wherein the same device is configured to be usable in configurations selected from the group consisting of Horizontal Coplanar, vertical co-axial and asymmetric configurations.

25. The device of claim 1, wherein the device is configured to measure an amplitude of a secondary electromagnetic field.

26. The device of claim 1, wherein the device has a transmitter coil placed strategically, which is not affected by the primary field and measures only the secondary electromagnetic field.

27. The device of claim 1, wherein the receiver coil is configured such that a depth of investigation of the device is about 75% greater compared to a conventional moving dipole device having a receiver coil configured such that a primary electric field from a transmitter coil of the conventional moving dipole device induces a current in a receiver coil of the conventional moving dipole device.

28. A method for carrying out geophysical surveys, to locate deeper sub-surface bodies under poor electrical conducting surfaces and for mapping sub-surficial conductivity changes due to salinity or pollution, the method comprising the steps of:
   (a) measuring an anomalous field resulting from a primary and a secondary electromagnetic field from a conducting target picked up by a receiver coil and resolved into in-phase (IP) and out-of-phase (OP) components using a sampling technique;
   (b) deriving IP and OP sampling pulses from a transmitter coil current for each transmitting current cycle to measure as said in step (a) with the sampling time being short compared to transmitting cycle time;
   (c) digitizing the electro magnetic field data from step (a) with A/D converter at a same point for a number of samples;
   (d) averaging the digitized data to enhance signal to noise ratio;
   (e) computing IP and OP components of the anomalous field and storing the IP and OP components in binary form; and
   (f) displaying the IP and OP components on an output device and transferring the data to a digital computer through a communication interface.

29. The method according to claim 28, wherein a total amplitude of a secondary electromagnetic field produced by the target measured in the absence of a large primary field is utilized to locate deeper and poorer conducting zones from an airborne EM survey.

30. The method according to claim 28, wherein the secondary electromagnetic field amplitude is increased by increasing transmitter signal frequency.

31. The method according to claim 28, wherein the number of samples is about one hundred.

32. A method for detecting a subsurface body comprising the steps of:
   supplying a continuous sinusoidal input current to a transmitting coil to generate a continuous, time varying primary electromagnetic field;
   positioning a receiving coil such that no current is induced in the receiving coil by the primary electromagnetic field; and
   measuring in-phase and out-of-phase components of a current induced in the receiving coil by a secondary electromagnetic field resulting from a current induced in the subsurface body by the primary electromagnetic field, wherein a depth of investigation of the device is about 75% greater than a depth of investigation of a conventional moving dipole device having a receiver coil positioned such that a current is induced in the receiver coil by a primary electric field generated by the conventional moving dipole device.

* * * * *